United States Patent [19]

Iwano et al.

[11] Patent Number: 4,677,755
[45] Date of Patent: Jul. 7, 1987

[54] COORDINATE MEASURING INSTRUMENT

[75] Inventors: Hideo Iwano; Kazuo Shudo, both of Kawasaki, Japan

[73] Assignee: Mitutoyo Mfg. Co., Ltd., Tokyo, Japan

[21] Appl. No.: 871,428

[22] PCT Filed: Oct. 28, 1985

[86] PCT No.: PCT/JP85/00596
§ 371 Date: May 16, 1986
§ 102(e) Date: May 16, 1986

[87] PCT Pub. No.: WO86/02720
PCT Pub. Date: May 9, 1986

[30] Foreign Application Priority Data

Oct. 29, 1984 [JP] Japan .................. 59-227535

[51] Int. Cl.⁴ .................................. G01B 7/03
[52] U.S. Cl. .................................. 33/503; 33/504
[58] Field of Search .............. 33/1 M, 147 N, 503, 33/504, 505

[56] References Cited

U.S. PATENT DOCUMENTS

| 3,636,635 | 1/1972 | Lemelson | 33/505 |
| 3,750,295 | 8/1973 | Nordmann et al. | 33/503 |
| 3,757,423 | 9/1973 | Wieg | 33/503 |
| 3,902,249 | 9/1975 | McClughan | 33/147 L |
| 3,979,835 | 9/1976 | Sumption et al. | 33/172 E |
| 4,035,922 | 7/1977 | von Voros | 33/147 N |
| 4,296,474 | 10/1981 | Hurt | 364/560 |
| 4,520,569 | 6/1985 | Ireland | 33/503 |
| 4,612,656 | 9/1986 | Suzuki et al. | 33/147 N |

FOREIGN PATENT DOCUMENTS

| 2512946 | 3/1983 | France . |
| 1540512 | 2/1979 | United Kingdom . |

Primary Examiner—Richard R. Stearns
Attorney, Agent, or Firm—Flynn, Thiel, Boutell & Tanis

[57] ABSTRACT

A coordinate measuring instrument for measuring a shape or the like of a work to be measured by a relative displacement value between a measuring element (28) and the work (30). The measuring instrument includes displacement detectors (23, 25, 27) for detecting displacement values of the measuring element (28) relative to the work (30) in the directions of X-, Y- and Z-axes and portable detecting units (35, 38) each having a displacement detector, and these detectors are connected to an input circuit (41) of a processing unit (32) in which the data is processed to output the measured value. The detecting units (35, 38) are selectively used depending on portions to be measured of the work.

9 Claims, 3 Drawing Figures

COORDINATE MEASURING INSTRUMENT

TECHNICAL FIELD

This invention relates to a coordinate measuring instrument wherein a measuring element is tridimensionally concerned with a work to be measured and the shape or the like of the work is measured from a relative movement value between the both members.

BACKGROUND TECHNIQUES

In recent years, there has been known a coordinate measuring instrument for measuring various shapes such as an outer diameter, an inner diameter of a hole and a center position of the hole of a work, which is rested on a mount, and has become increasingly common and is widely used for the measurement and the like of a tridimensional object with high accuracy.

The general construction of the coordinate measuring instrument of the type described has heretofore been one as shown in FIG. 3 for example. More specifically, in FIG. 3, a pair of supports 3 are erected from a mount 2 formed of a stone surface plate or the like rested on a support base 1, a transverse member 4 made smoothly movable by an air bearing or the like in the longitudinal direction, i.e. the direction of Y-axis is mounted onto these supports 3, and a relative movement value between the transverse member 4 and one of the supports 3 is detected by a Y-axis displacement detector 5 comprising an optical displacement detector or the like. A slider 6 is provided on the transverse member 4 in a manner to be made smoothly movable by an air bearing or the like in the lateral direction, i.e. the direction of X-axis, and a relative movement value between this slider 6 and the transverse member 4 is detected by an X-axis displacement detector 7 comprising an optical displacement detector or the like. A square shaft-shaped spindle 9 provided at the bottom end thereof with a measuring element 8 is supported by the slider 6 in a manner to be made slidable by an air bearing or the like in the vertical direction, i.e. the direction of Z-axis, and a relative movement value between this spindle 9 and the slider 6 is detected by a Z-axis displacement detector 10 comprising an optical displacement detector similar to the above-mentioned detectors. Here, the transverse member 4, the slider 6 and the spindle 9 constitute a measuring element support member 11. In consequence, the measuring element 8 is supported by the measuring element support member 11, and the measuring element 8 is supported in a manner to be made movable relative to a work 12 to be measured, which is rested on the mount 2, tridimensionally, i.e. in the directions X-, Y- and Z-axes.

With the above-described arrangement, a shape or the like of the work 12 is measured such that: a spindle 9 is manually grasped, or gripped by a hand of a robot in the case of an automatical measurement, and the measuring element 8 is brought into contact with a preset origin to obtain a reference of polar coordinates; subsequently, the measuring element 8 is brought into contact with measuring points of the work 12 and the relative movement values of this measuring elements from the origin in the directions of X-, Y- and Z-axes are measured by the detectors 5, 7 and 10; and signals from the detectors 5, 7 and 10 are suitably processed by a processing unit comprising a computer or the like, not shown, to thereby obtain measured values.

Now, in the coordinate measuring instrument of the type described, to achieve the measurement with high accuracy, constructions of various portions are formed solidly, and the measuring element 8 is integrally secured to the measuring element support member 11, at a predetermined distance therefrom. In consequence, the conventional coordinate measuring instrument presents the following disadvantages.

(1) In order to move the measuring element 8 to a desired measured surface of the work 12, the measuring element 8 should necessarily be moved together with a moving mechanism as a whole, i.e. the measuring element support member 11, and moreover, depending on the shape of the work 12, the measuring element should be moved, making a detour around the work 12. Thus, the working efficiency becomes low, and further, there is a possibility of causing damages to the measuring element 8 due to a collision of the measuring element during the detour.

(2) As in the case where the work 12 has a protruding portion and a portion formed at the undersurface of this protruding position is measured, there may occur a surface to be measured, against which the measuring element 8 cannot abut or cannot easily abut. In such cases, deliberate works may be required or works of remounting the work 12 for change in its posture may be needed.

(3) As in the case of measuring the dimension of a hole, where the thickness or position does not matter much, but only the diameter of the hole is objected, the portions to be measured include many points not requiring a positioning in the absolute coordinate system, i.e. the distance from the origin, however, all of these measurements are carried out by moving the measuring element 8 tridimensionally in the same manner as in the conventional example.

As described above, all of the above-described disadvantages lower the working efficiency. As the scope of application to objects to be measured is expanded and the shapes of the objects become complicated, these disadvantages have become important factors to impede the spread of the coordinate measuring instrument unless these disadvantages are obviated.

Additionally, the coordinate measuring instruments need not necessarily be limited to the shape shown in FIG. 3 and have various types including one in which gate-shaped columns are slidably mounted on the mount, one in which the measuring element support member is formed into a cantilever beam shape, and further, one in which the mount is made movable in the direction of Y-axis. However, the above-described disadvantages are common to the coordinate measuring instruments of all types.

The present invention has as its object the provision of a coordinate measuring instrument wherein the measurement suitable for the characteristics of the portion to be measured of the work can be performed and the measuring efficiency can be highly improved.

DISCLOSURE OF THE INVENTION

To this end, the present invention contemplates that: a measuring element is provided which is movable tridimensionally relative to a work rested on a mount; X-, Y- and Z-axis displacement detectors are provided which detect relative movement values of the measuring element to the work in the directions of X-, Y- and Z-axes, respectively; a portable detecting unit is provided which includes a reciprocatingly movable contact and a contact displacement detector for detecting a displacement value of the contact; the detecting unit and the X-, Y- and Z-axis displacement detectors are connected to an input circuit of a processing unit, respectively; and a shape or the like of the work is measured by the processing unit, utilizing output signals commensurate to the respective axis displacement values of the respective axis displacement detectors and the output of the detecting unit; whereby the portion to be measured, requiring the positioning in the absolute coordinate system is measured by the X-, Y- and Z-axis displacement detectors, and the portion not necessarily requiring the positioning in the absolute coordinate system, such as the thickness, is easily measured by use of the detecting unit.

THE MOST PREFERRED FORM FOR WORKING THE INVENTION

Description will hereunder be given of an embodiment, in which the present invention is applied to the coordinate measuring instrument different from the conventional one, with reference to the drawings.

Figure 1:
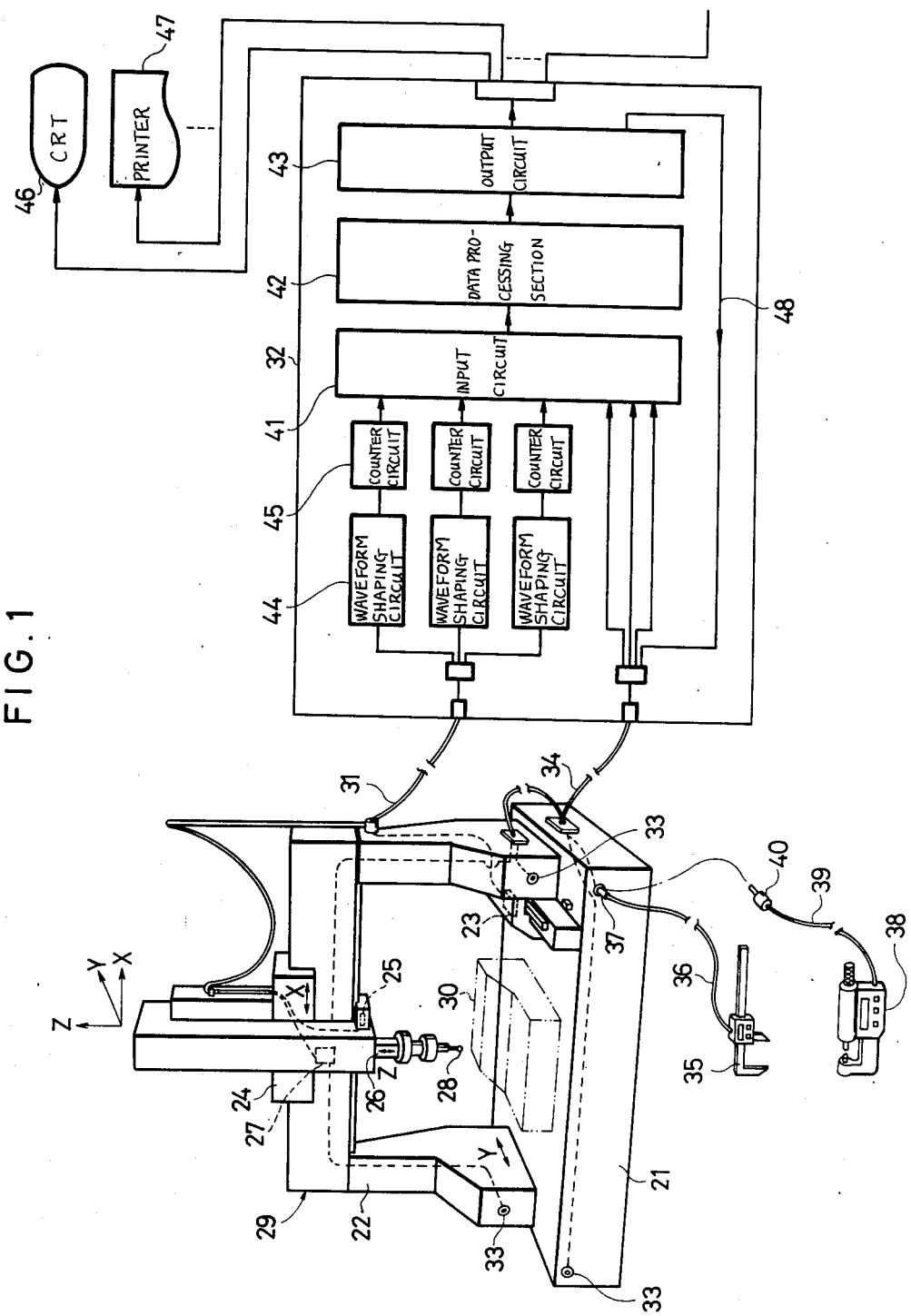
FIG. 1 is a general arrangement view showing an embodiment of the coordinate measuring instrument according to the present invention.

In FIG. 1 showing the general schematic arrangement, gate-shaped column 22 is rested on a mount 21 comprising a stone surface plate or the like in the longitudinal direction, i.e. the direction of Y-axis, and a relative movement value between one of the column 22 and the mount 21 is detected by the Y-axis displacement detector 23.

A slider 24 is provided on a top beam of the columns 22 in a manner to be made movable by an air bearing or the like in the lateral direction, i.e. the direction of X-axis, and a relative movement value between the slider 24 and the column 22 is detected by the X-axis displacement detector 25.

A square shaft-shaped spindle 26 is provided on the slider 24 in a manner to be made slidable by an air bearing or the like in the vertical direction, i.e. the direction of Z-axis, a relative movement value between the spindle 26 and the slider 24 is detected by the Z-axis displacement detector 27, and a measuring element 28 is detachably mounted to the bottom end of the spindle 26. Here, the column 22, the slider 24 and the spindle 26 constitute a measuring element support member 29. In consequence, the measuring element 28 is made movable by this measuring element support member 29 relative to a work 30 to be measured, which is rested on the mount 21, in the directions of X-, Y- and Z-axis, i.e. tridimensionally, these relative movement values are detected by respective axis displacement detectors 23, 25 and 27, and detection signals from these detectors 23, 25 and 27 are inputted to a processing unit 32 through a respective axis signal cord 31. Furthermore, the detectors 23, 25 and 27 each comprise an optical detector or the like emitting a digital signal of one pulse per unit length of 0.1 micron meter, and can measure with accuracy of 0.1 micron meter.

A plurality of jacks 33 are provided at predetermined positions on the columns 22 and the mount 21, and connected to the processing unit 32 through a unit signal cord 34. Furthermore, a plug 37 connected through a cable 36 to a slide caliper type detecting unit 35 or a plug 40 connected through a cable 39 to a micrometer type detecting unit 38 is made connectible to each of the jacks 33, signals of values measured by these detecting units 35 and 38 are inputted to the processing unit 32 through the cables 36, 39, the plugs 37, 40, the jacks 33 and the unit signal cord 34.

These detecting units 35 and 38 are constructed such that the cables 36 and 39 have sufficient lengths for allowing the detecting units to approach any of the surfaces to be measured of the work 30 rested on the mount 21, the dimensions and the like of the surfaces of the work 30 can be measured with accuracy of 0.1 micron meter, and a digital signal of 0.1 micron meter/pulse can be outputted as a measured value, i.e. a signal to be digitally displayed as it is.

The processing unit 32 comprises an input circuit 41, a data processing section 42 and an output circuit 43. The input circuit 41 can receive an input signal through a waveform shaping circuit 44 and a counter circuit 45 or receive directly depending on the characteristics of the input signal. In this case, in this embodiment, since the output signals from the X-, Y- and Z-axis displacement detectors 25, 23 and 27 are not waveform-processed and so on at all, the outputs are inputted through the waveform shaping circuit 44 and the counter circuit 45, respectively. Since the detecting units 35 and 38 are provided therein with devices for the waveform shaping, the counting and so on, measured values can be outputted as the so-called measured value signals, the signals can be directly signal-inputted to the input circuit 41.

Signals from the input circuit 41 are suitably processed by the data processing section 42. More specifically, all of the processes necessary for the measurements, for example, are performed such that: data of a circle, given as signals of three points are processed to calculate the diameter of the circle or the center position thereof; in which turn the value thus calculated is outputted; and further, a mean value is calculated from a plurality of signals. Signals from this data processing section 42 are outputted to external output devices including a cathode ray tube 46, a printer 47 and so on, through the output circuit 43. Furthermore, when the operation reaches a portion to be measured by use of the detecting units 35 or 38, from the output circuit 43, there is provided a measurement instructing signal line 48 for instructing that the detecting units 35 or 38 should be used. A signal from this measurement instructing signal line 48 informs the detecting unit 35 or 38 that a predetermined instruction has been given to the detecting unit 35 or 38.

When the cables 36 and 38 are sufficiently long, the plugs 37 and 40 may be directly connected to the processing unit 32.

Figure 2:
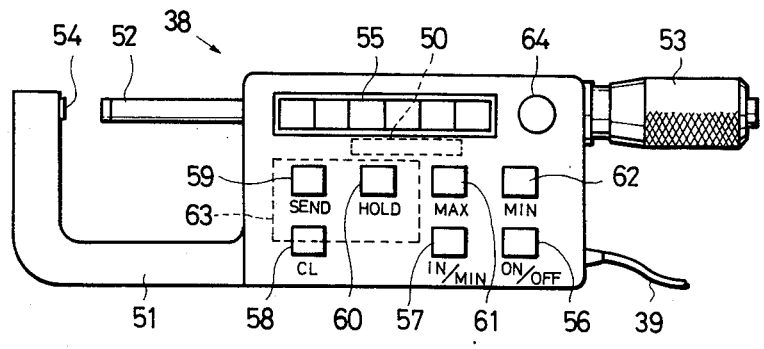
FIG. 2 is a front view showing an embodiment of the detecting unit used in the present invention.

FIG. 2 shows the construction of the micrometer type detecting unit 38 in detail. This detecting unit 38 includes a contact 52 reciprocatingly movably supported on a body 51 and a thimble 53 for reciprocatingly moving this contact 52, and clamps a portion to be measured of the work 30 between the contact 52 and an anvil 54 formed on the body 51, whereby a relative movement between the body 51 and the contact 52 is detected as the dimension of the portion to be measured by a linear or rotary encoder as being a contact displacement detector 50, a signal thus detected is electrically processed, and can be displayed in a digital indicator 55 as in inches or mm. Furthermore, the body 51 includes: an on-off switch 56 for on-off operating a power source; an inch-millimeter change-over switch 57 for changing inches for mm or vice versa; a clear switch 58 for clearing a measured value displayed in the digital indicator 55; a transmitting switch 59 for transmitting a command to deliver necessary data out of data measured by the movement of the contact 52 of the body 51 to the processing unit 32; a hold switch 60 for holding measured data; a maximum value display switch 61 and a minimum value display switch 62 for selecting the maximum value or the minimum value out of the measured data and displaying the same in the digital indicator 55; an unit processing circuit 63 for processing signals from the contact displacement detector 50 so that these switches can achieve the functions thereof; and a measurement instructing lamp 64 as being measurement instructing means for displaying that the detecting unit 38 is in the state of measuring the portion to be measured in response to a signal from the output circuit 43 of the processing unit 32.

The slide caliper type detecting unit 35, not shown, also has the same function as the detecting unit 38 has. In the following description, component parts of the detecting unit 38 are common to those of the detecting unit 35.

Description will hereunder be given of the method of use of this embodiment.

In starting the measurement, depending on the shape of the work 30, there are prepared one or plurality of detecting units 35 and/or 38, and the plugs 37 and 40 of the detecting units 35 and 38 are inserted into the jacks 33 at positions suitable for the measurement. Subsequently, the switches necessary for the measurement such as the power source switch are thrown in, and the measurement is begun. Similarly to the conventional example, the measurement by use of the measuring element 28 is performed such that the measuring element 28 is tridimensionally moved by the spindle 26 relative to the work 30 rested on the mount 21, and the measuring element 28 is brought into contact with the portion to be measured of the work 30. The measurement by use of the measuring element 28 is normally performed in the previously instructed order. However, when it is convenient to measure a portion to be measured by use of the detecting unit 35 or 38 on the way of the measurement by this measuring element 28, a measurement instruction signal is delivered to a predetermined detecting unit 35 or 38, and the measurement instructing lamp 64 is turned on in response to this signal. A measurer performs a necessary measurement by use of the detecting unit 35 or 38 in accordance with the instruction of lamp thus turned on.

Thereafter, the work 30 is successively measured by use of the measuring element 28 or the detecting unit 35 and/or the detecting unit 38, and all of the portions to be measured are measured, thus completing the measurement. Measurement signals detected as described above are delivered through the input circuit 41 of the processing unit 32 to the data processing section 42, where the measurement signals are processed in a predetermined mode, and displayed in the cathode ray tube 46 and printed out in the printer 47 as both members being the output devices, through the output circuit 43.

In this embodiment with the above-described arrangement, the portions to be measured, which require the positioning in the absolute coordinate system, can be measured by use of the measuring element 28 capable of absolutely measuring in the same manner as with the conventional coordinate measuring instrument, and the portions to be measured, which should not necessarily need the positioning in the absolute coordinate system can be measured by use of the portable detecting unit 35 and/or 38, so that the detecting means can be properly used depending upon the characteristics of the work 30 such as the shape, and the working efficiency in the measurement can be highly improved. There are few cases where the measuring element 28 should be changed in posture, so that the working efficiency can be improved from this point too. Recheck of the origin in this case becomes not necessary, the working efficiency can be improved. Moreover, damages to the measuring element 28 which would otherwise be caused by making the detour around the work 30 can be avoided. The detecting units 35 and 38 can be utilized for the adjustment in assembling of the main body of measuring instrument, so that the manufacturing cost of the measuring instrument can be reduced. Since the detecting units 35 and 38 are of portable type, the work 30 can be worked on from all the directions, the undersurface and the like of the protruding portion of the work 30 can be easily measured, and further, the jacks 33 located at convenient positions can be utilized to further improved the facility. The results measured by the detecting units 35 and 38 can be processed in series with the ordinary measurements, so that extra data processing works are not necessary and the data displayed in the cathode ray tube 46 and the printer 47 can be utilized as measured values as they are. Further, when the outer appearances of constructions of the detecting units 35 and 38 are made similar to those of the conventional micrometer, slide calipers, depth gauge, hole tester and the like, there should be no feeling of unusualness as compared with the measuring works by use of the conventional various measuring instruments of this type, so that the working efficiency can be improved from this point too.

The detecting units 35 and 38 have the transmitting switches 59, whereby only the necessary data can be delivered without sending erroneous data and the like to the processing unit 32, so that no confusion is caused to the processing in the processing unit 32. The detecting unit 38 has the hold switch 60, the maximum value display switch 61 and the minimum value display switch 62, so that necessary data can be displayed in the indicator 55 on the way of the measurement and changing from inches to mm and vice versa can be performed by the use of the inch-millimeter change-over switch 57. Furthermore, the detecting units 35 and 38 to be used are given the instructions by the measurement instructing lamp 64, so that an erroneous measurement can be avoided and the measuring efficiency can be improved.

Figure 3:
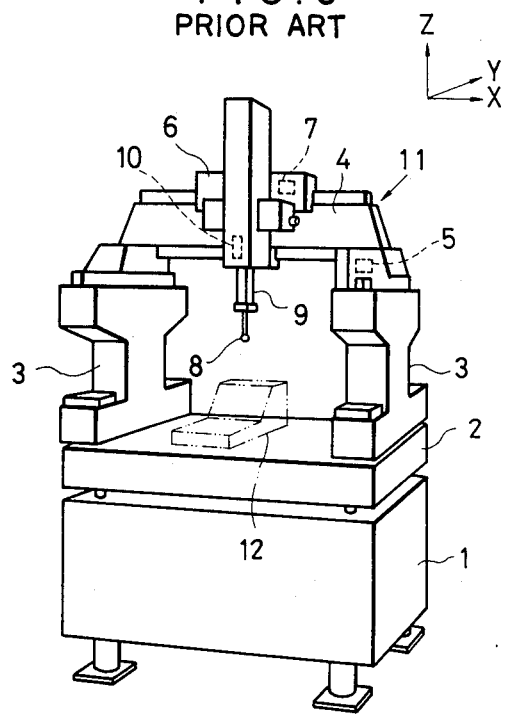
FIG. 3 is a perspective view showing an example of the conventional coordinate measuring instrument.

In the above embodiment, it has been described that the X-axis displacement detector 25, the Y-axis displacement detector 23 and the Z-axis displacement detector 27 have neither waveform shaping circuit nor counter circuit, while, the detecting units 35 and 38 have the waveform shaping circuit and the counter circuit, however, the present invention need not necessarily be limited to this, and the waveform shaping circuit and the counter circuit may be assembled into the respective axis displacement detectors 25, 23 and 27. Whereas, such an arrangement may be adopted that the waveform shaping circuit and the counter circuit are not assembled into the detecting units 35 and 38, and signals may be inputted to the input circuit 41 through the waveform shaping circuit 44 and the counter circuit 45, which are provided on the side of the processing unit 32. The coordinate measuring instrument according to the present invention need not necessarily be limited to the coordinate measuring instrument of the type shown in the embodiment of FIG. 1, and the present invention is applicable to the coordinate measuring instrument of the type shown in FIG. 3, the coordinate measuring instrument of the type wherein the mount is movable and the coordinate measuring instruments of other types. Whatever the method of driving the measuring element 28 is may be used a manual method, an automatic method of using a robot, a method of using motors on every shafts, and so on. Further, the functions of the detecting units 35 and 38 need not necessarily be defined by the various switches shown in FIG. 2, and the functions may be defined by some of the these switches, or switches having functions other than the aforesaid switches may be used. Furthermore, the measurement indicating lamp 64 may be replaced by another instructing means such as a buzzer. The positions of providing the measurement instructing means need not necessarily be limited to the detecting units 35 and 38, and the instructing means may be provided on the external output device such as the cathode ray tube 46 and other components, however, when the instructing means are provided on the detecting units 35 and 38, it is expedient in the steps of measuring. The output signals from the respective axis displacement detectors 25, 23 and 27 and the detecting units 35 and 38 need not necessarily be limited to the digital signals, and may be analogue signals. However, the use of the digital signals is advantageous in that the signals can be processed easily and the adverse influence of noises can be reduced. Further, in the above embodiment, the detecting units 35 and 38 have been connected to the processing unit 32 through the cables 36, 39 and the cord 34, however, the present invention need not necessarily be limited to this, and the detecting units 35 and 38 may be connected to the processing unit 32 wirelessly through electric wave, light wave and the like. The wireless connection as described above can improve the facility of the detecting units 35 and 38. The term "the absolute coordinate system" in this specification does not mean that the origins on the respective surfaces of X, Y and Z are all derived from one and same origin. The term contemplates a concept including a case where a coordinate system is shown as referenced from the origins different from surface to surface to thereby indicate the positions of the respective portions to be measured for example, or a case where a coordinate system at the time of measurement is converted by the processing unit 32 into a suitable coordinate system to thereby indicate the measured values.

The present invention as described above can offer the advantages of providing the coordinate measuring instrument capable of performing the measurement with high efficiency depending upon the portions to be measured of the work.

USABILITY IN INDUSTRIES

The coordinate measuring instrument according to the present invention can be utilized for the general field of measuring the shapes and the like of the works to be measured.

What is claimed is:

1. A coordinate measuring instrument having a measuring element supported in a manner to be movable relative to a work to be measured rested on a mount tridimensionally, i.e. in the directions of X-, Y- and Z-axes, said work having a shape which is measured from a displacement value between said work and said measuring element, comprising:

X-, Y- and Z-axis displacement detector means for detecting the relative displacement values in the directions of said X-, Y- and Z-axes between said work and said measuring element;

at least one portable detecting unit including a reciprocatingly movable contact and a contact displacement detector for detecting a displacement value of said contact;

each said X-, Y- and Z- axis displacement detector means and said contact displacement detector of said detecting unit being connected to an input circuit of a processing unit having a data processing section and an output circuit;

said output circuit providing output signals commensurate to displacement values from each said X-, Y- and Z- axis displacement detector means and said contact displacement detector of said detecting unit being utilized to make said processing unit able to measure the shape of said work;

means defining a plurality of jacks electrically connected to said input circuit of said processing unit, said jacks being spaced from one another around said mount; and said detecting unit being connected through a cable having a plug on an end thereof received in a one of said jacks to said input circuit in a manner to be accessible to any one object surface of measurement of said work rested on said mount.

2. A coordinate measuring instrument as set forth in claim 1, wherein a plurality of said portable detecting unit are provided.

3. A coordinate measuring instrument as set forth in claim 1, wherein said detecting unit is formed to be able to output one pulse per unit length.

4. A coordinate measuring instrument as set forth in claim 1, wherein said detecting unit is formed to be able to output a measured value commensurate to a displacement value of said contact.

5. A coordinate measuring instrument as set forth in claim 4, wherein said detecting unit is formed to include a digital indicator for digitally indicating said measured value.

6. A coordinate measuring instrument as set forth in claim 1, wherein said detecting unit is formed to include measurement instructing means for instructing a measurement by use of said detecting unit.

7. A coordinate measuring instrument as set forth in claim 6, wherein said measurement instructing means includes means for indicating the instruction in said detecting unit by turning on a light.

8. A coordinate measuring instrument as set forth in claim 1, wherein said detecting unit includes means for selectively delivering measured data to said processing unit.

9. A coordinate measuring instrument as set forth in claim 1, wherein a measured value is indicated in an external component.

* * * * *